United States Patent Office 3,209,231
Patented Sept. 28, 1965

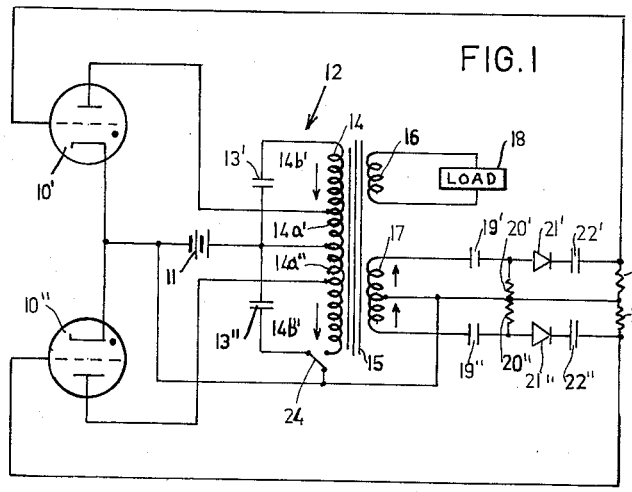
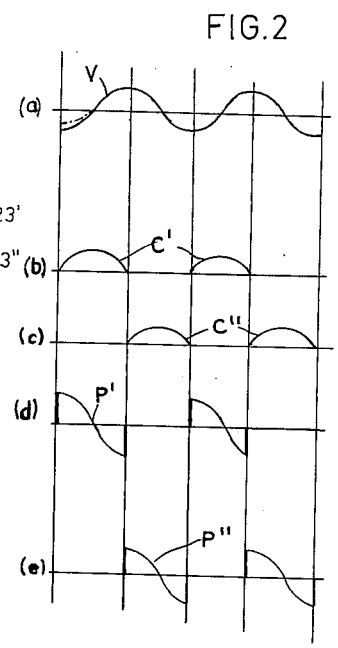
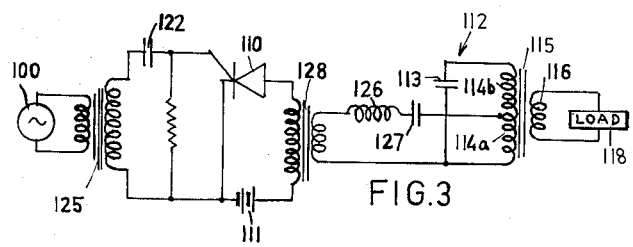
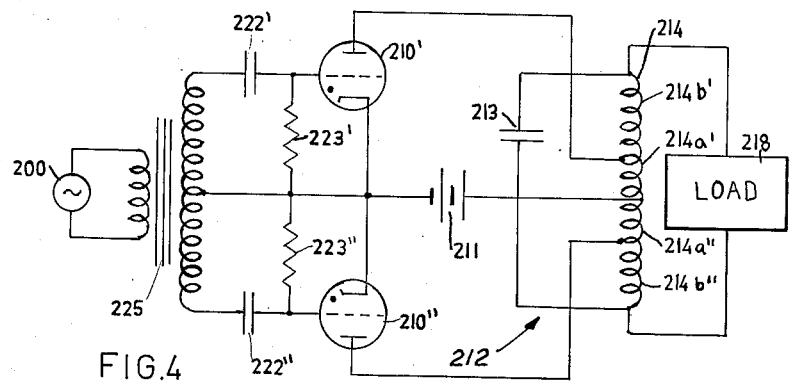
ROBERT H. PINTELL
*INVENTOR.*
BY
*Karl F. Ross*
AGENT

3,209,231
ALTERNATING-CURRENT SOURCE
Robert H. Pintell, New York, N.Y., assignor to Intron International, Inc., Bronx, N.Y., a corporation of New York
Filed June 14, 1961, Ser. No. 117,168
4 Claims. (Cl. 321—36)

My present invention relates to a primary or secondary source of alternating current, i.e., an oscillator or an amplifier, and has for its general object the provision of means for producing an oscillatory output of, or centered on, a predetermined frequency in a manner considerably more efficient than the operation of conventional circuit arrangements.

It is known to generate alternating currents, either in response to an external signal or through feedback, with the aid of a pair of push-pull-connected electronic breakdown devices of the three-electrode type, such as thyratrons, ignitrons, controlled rectifiers and the like, which are alternately triggered and quenched, the quenching being effected by means of a so-called commutating condenser connected across the output electrodes of these devices in such manner that the start of conduction through one device applies an extinction potential to the other. Since the condenser terminals are connected directly to the aforementioned output electrodes whose potentials are subject to abrupt changes, each change in conductivity is accompanied by a sudden charge reversal involving the flow of relatively large and wasteful switching currents. A more particular object of my invention, therefore, is to eliminate the loss of power due to this mode of commutation. An ancillary object of my invention is to provide novel commutating means applicable not only to push-pull systems but to unbalanced circuit arrangements as well.

In accordance with a feature of this invention I provide, in combination with an electronic breakdown device or a pair of such devices connected in push-pull, a parallel-resonant network having a fraction of its inductive branch effectively connected in series with the output circuit of each device together with a source of direct current therefor. The network is tuned to substantially the frequency at which the breakdown device or devices are triggered, such synchronism being automatically assured if the triggering is accomplished by pulses derived from the current oscillating in the network itself. It is to be understood that the inductive branch of the network includes not only a coil (or combination of coils) connected directly across the capacitive branch thereof but also any additional reactances coupled therewith, such as transformer windings, load reactances and other circuit elements in cascade therewith, all of which must be considered in the determination of the natural frequency of the network. Thus, the output current of the breakdown device may be drawn from its source through the primary of a transformer whose secondary is connected, directly or through the intermediary of further reactive impedances, across a portion of a coil shunting the capacitive branch of the network.

The fraction of an inductance coil so connected across the output circuit of a thyratron or other breakdown device includes advantageously less than half the turns of such coil which thus acts as an autotransformer drawing a relatively small charging current at high voltage from the condenser or condensers of the capacitive branch. After the flow of this current has continued for a period determined by the resonance frequency of the network, it reverses its direction whereby a quenching potential of negative polarity is applied to the output electrode of the breakdown device acting as the anode so that conductivity through the device ceases. Thereafter, at substantially the instant when the flow of reverse current has run its course, the breakdown device is again triggered to repeat the cycle.

The invention will be described in greater detail with reference to the accompanying drawing in which:

FIG. 1 is a circuit diagram of a push-pulll oscillator embodying the invention;

FIG. 2 is a set of graphs useful in explaining the operation of the system of FIG. 1;

FIG. 3 is a circuit diagram of an unbalanced amplifier representing another embodiment; and FIG. 4 is a view similar to FIG. 3 of a push-pull version of such amplifier.

FIG. 1 shows an oscillatory system according to the invention, comprising a pair of push-pull-connected three-terminal breakdown devices here represented by thyratons 10', 10" whose cathodes are tied to the negative terminal of a source of direct current shown as a battery 11. The positive terminal of the battery is connected to the midpoints of a capacitive and an inductive branch of a parallel-resonant network 12 formed by two series-connected condensers 13', 13" and a coil 14 bridged thereacross. Coil 14 also constitutes the primary winding of an output transformer 15 whose secondary windings 16 and 17 effectively form part of the inductive branch of the network; winding 16 is connected across a load 18 whereas winding 17 is included in a feedback circuit whose two branches respectively comprise condensers 19', 19" and resistors 20', 20", constituting a first differentiation network, rectifiers 21', 21", and condensers 22', 22" constituting with resistors 23', 23" a second differentiation network. The junctions of the last-mentioned resistors and condensers are returned to the grids of thyratrons 10' and 10", respectively, whose plates are connected at symmetric locations to intermediate taps on coil 14.

A starting switch 24, when open, keeps condenser 13" charged from battery 11 and may be closed to initiate a discharge of this condenser through the lower half of coil 14. The resulting voltage across secondaries 16, 17 is a sinusoidal wave shown at V in graph (*a*) of FIG. 2. From the arrows in FIG. 1 it will be apparent that the polarity of the secondary voltage in winding 17 is opposite that of the primary voltage in coil 14 so that, at this instant, the differentiation circuit 19', 20' produces a current C' passed by the diode 21' as shown in FIG. 2(*b*). Differentiation of this current in circuit 22', 23' then gives rise to a pulse P', FIG. 2(*d*), whose positive leading edge triggers the starting electrode or grid of thyratron 10' and causes it to conduct. Current now flows from battery 11 through the plate-cathode circuit of thyratron 10' by way of the lower portion 14a' of the upper half of coil 14, the autotransformer action of this coil causing the simultaneous flow of a balancing current through the larger upper portion 14b' in series with portion 14a' whereby condenser 13' is charged negatively until the potential at the junction of portions 14a', 14b' has fallen to a level at which the thyratron 10' ceases to conduct. During the same interval, which corresponds to half a period of the resonance frequency of network 12 (taking into consideration the reactive components of the load and feedback circuits energized by coil 14), condenser 13" has reversed its charge so that both condensers now have negative potential on their upper and positive potential on their lower terminals. A reverse current now begins to flow during the next half-cycle, giving rise to a secondary current C", FIG. 2(*c*), which is passed by the rectifier 21" and differentiated at 22", 23" to produce a starting pulse P", FIG. 2(*e*), for triggering the thyratron 10". Battery 11 then discharges through thyratron 10" by way of coil portion 14a" so as to draw a balancing current through coil portion 14b", thereby again initiating a reversal of the charge on condenser 13" while a similar reversal occurs with condenser 13' by reason of resonant current flow through the upper coil half 14a', 14b'. Thus, the two thyratrons are alternately quenched, by a mode of operation which can be described as "resonant commutation," in timed relationship with their alternate triggering at a rate of recurrence corresponding to the operating frequency of tuned network 12.

It will be apparent that the oscillatory current flowing in the two halves of coil 14 will cause the voltage across each condenser 13', 13" to vary by almost twice the voltage of battery 11. The same will be true if the system is converted into an unbalanced oscillator by the removal of half of its circuits, e.g., of all the elements designated by a single prime.

The system of FIG. 3 constitutes a single-ended or unbalanced alternating-current generator serving for the amplification of signals from a source 100. It comprises a single breakdown device 110, here shown as a controlled solid-state rectifier, whose cathode-gate circuit is connected across an input transformer 125 in cascade with a differentiation circuit comprising a condenser 122 and a resistor 123. The cathode-anode circuit of controlled rectifier 110 is connected, in series with battery 111, across the primary of a coupling transformer 128 whose secondary, in series with an inductance 126 and a capacitance 127, bridges a minor portion 114a of a coil 114. The coil 114 is connected across a condenser 113 and represents the primary winding of an output transformer 115 whose secondary winding 116 feeds a load 118.

The condenser 113 is the capacitive branch of a resonant network 112 whose inductive branch includes the coil 114 and associated reactances. The resonance frequency of this network corresponds substantially to the mid-frequency of the source 100 which may be a generator of frequency-modulated carrier waves. The output of this generator, sharpened into pulses by the differentiator 122, 123, periodically triggers the breakdown device 110 which thereupon becomes conductive, the discharge of battery 111 through the primary of transformer 128 promoting a balancing current flow through the two portions 114a, 114b of coil 114 so as to charge the condenser 113 in the manner previously described with reference to FIG. 1. The reversal of current flow through coil 114 results in the application of a quenching potential to the anode of controlled rectifier 110, the cycle being thereupon repeated by a new trigger pulse upon the reverse charge on condenser 113 reaching substantially its peak value.

The inclusion of additional reactances in the output circuit of the breakdown device will be desirable in many instances for purposes of frequency and/or amplitude stabilization. A particularly advantageous arrangement is the insertion of a series-resonant network, as illustrated at 126, 127, tuned to a frequency slightly different from and preferably higher than that of the parallel-resonant overall network 112 whereby the impedance of the series network will be capacitive and will vary along a sloping portion of its resonance curve. I have found that a resonance frequency of that network about 25% higher than the operating frequency established by network 112 is highly effective.

In FIG. 4 I have shown a push-pull-type amplifier representing a combination of features from the systems of FIGS. 1 and 3. The breakdown devices 210' and 210", here again shown as thyratrons, have their output circuits connected across minor portions 214a', 214a" of a coil 214 bridging the capacitive branch of a resonant network 212; this branch, in contradistinction to that of FIG. 1, consists of a single condenser 213. Direct-current source 211 is connected, as before, between the cathodes of the thyratrons and the midpoint of coil 214. The timing circuit serving to trigger the thyratrons includes an oscillation generator 200, a transformer 225, and two differentiation circuits 222', 223' and 222", 223" bridged across the secondary of this transformer. A load 218 is shown connected directly across the outer terminals of coil 214.

In operation, a breakdown of thyratron 210' by an appropriate input pulse from circuit 222', 223' will cause the battery 211 to discharge through portion 214a' while a balancing current flows through the remaining coil portions 214b' and 214a" and 214b" to charge the condenser 213 so that its upper plate goes negative with respect to its lower plate. When the oscillating current in network 212 reverses, thyratron 210' is cut off substantially at the instant when another triggering pulse is applied to thyratron 210" to fire the latter. Next, primary current flows through coil portion 214a", the remaining coil portions carrying a balancing current to reverse the charge on the condenser 213. In this manner oscillations are maintained in the network 212 as long as a succession of properly timed starting pulses are applied alternately to the grids of thyratrons 210' and 210".

Generally, the circuit elements constituting the networks 12, 112, 212 should be designed with such a high "Q," or low damping factor, as to maintain the oscillations therein substantially independent of the presence or absence of a load or major variations in load impedance. The ratio of circulating volt-amperes to load watts during normal operations may advantageously be of the order of 2:1.

My invention is, of course, not limited to the specific embodiments described and illustrated but may be realized in various modifications, adaptations and combinations of disclosed features without departing from the spirit and scope of the appended claims.

I claim:

1. An alternating-current generator comprising an electronic breakdown device having two main electrodes and a starting electrode, a parallel-resonant network with a capacitive branch and an inductive branch tuned to a predetermined operating frequency, a source of direct current, circuit means effectively connecting a minor fraction of said inductive branch across said main electrodes in series with said source, said circuit means being substantially noninductive at said operating frequency, and timing means connected between one of said main electrodes and said starting electrode for periodically applying trigger pulses to said breakdown device at a recurrence rate substantially equal to said operating frequency.

2. An alternating-current generator comprising two electronic breakdown devices each having two main electrodes and a starting electrode, a parallel-resonant network with a capacitive branch and an inductive branch tuned to a predetermined operating frequency, a source of direct current, circuit means effectively connecting a minor fraction of said inductive branch in push-pull across said main electrodes of each breakdown device in series with said source, said circuit means being substantially noninductive at said operating frequency, and timing means connected between one of said main electrodes and said starting electrode of each breakdown device for alternately applying trigger pulses to said breakdown devices at a recurrence rate for each breakdown device substantially equal to said operating frequency.

3. An alternating-current amplifier comprising an electronic breakdown device having two main electrodes and a starting electrode, a parallel-resonant network with a capacitive branch and an inductive branch tuned to a predetermined operating frequency, a source of direct current, circuit means effectively connecting a fraction of said inductive branch across said main electrodes in series with said source, said circuit means being substantially noninductive at said operating frequency, and timing means connected between one of said main electrodes and said starting electrodes for periodically applying trigger pulses from an external signal source to said breakdown device at a recurrence rate substantially equal to said operating frequency.

4. An alternating-current amplifier comprising two electronic breakdown devices each having two main electrodes and a starting electrode, a parallel-resonant network with a capacitive branch and an inductive branch tuned to a predetermined operating frequency, a source of direct current, circuit means effectively connecting a fraction of said inductive branch in push-pull across said main electrodes of each breakdown device in series with said source, said circuit means being substantially noninductive at said operating frequency, and timing means connected between one of said main electrodes and said starting electrode of each breakdown device for alternately applying trigger pulses from an external input source to said breakdown devices at a recurrence rate for each breakdown device substantially equal to said operating frequency.

References Cited by the Examiner

UNITED STATES PATENTS

| | | | |
|---|---|---|---|
| 2,338,079 | 12/43 | Huge | 321—36 |
| 2,413,181 | 12/46 | Hergenrother | 328—210 |
| 2,929,013 | 3/60 | McMamee | 331—128 |
| 3,026,486 | 3/62 | Pintell | 331—117 |
| 3,117,272 | 1/64 | Quinn | 321—36 |

OTHER REFERENCES

Article by Higdon et al. in Electronic Engineering, August 1959, pp. 475–479.

Applications and Circuit Design Notes by Solid State Products, Incorporated, Bulletin D420–02–12–59, May 1960, p. 7.

LLOYD McCOLLUM, *Primary Examiner.*

JOHN KOMINSKY, *Examiner.*